US007175780B1

(12) United States Patent
Sutherland et al.

(10) Patent No.: US 7,175,780 B1
(45) Date of Patent: Feb. 13, 2007

(54) TAILORING MATERIAL COMPOSITION FOR OPTIMIZATION OF APPLICATION-SPECIFIC SWITCHABLE HOLOGRAMS

(75) Inventors: Richard L. Sutherland, Bellbrook, OH (US); Lalgudi V. Natarajan, Beavercreek, OH (US); Robert T. Pogue, Pittsburgh, PA (US); Christina K. Shepherd, Beavercreek, OH (US); Donna M. Brandelik, New Carlisle, OH (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/332,247

(22) Filed: Jan. 17, 2006

Related U.S. Application Data

(63) Continuation of application No. 10/303,927, filed on Nov. 26, 2002, now Pat. No. 7,018,563.

(51) Int. Cl.
*C09K 19/52* (2006.01)
*C09K 19/38* (2006.01)
*C09K 19/54* (2006.01)

(52) U.S. Cl. .............................. 252/299.01; 252/299.1; 252/299.5; 349/86; 349/88; 349/92

(58) Field of Classification Search ................ 428/1.1; 252/299.01, 299.5, 299.1; 349/88, 92, 93, 349/86
See application file for complete search history.

(56) References Cited

U.S. PATENT DOCUMENTS

| | | | |
|---|---|---|---|
| 3,432,225 A | 3/1969 | Rock | 350/164 |
| 3,565,509 A | 2/1971 | Sulzbach | 350/164 |
| 3,580,655 A | 5/1971 | Leith et al. | 350/3.5 |
| 3,658,526 A | 4/1972 | Haugh | 96/27 |
| 3,667,946 A | 6/1972 | Sturdevant | 96/35.1 |
| 3,758,186 A | 9/1973 | Brumm | 350/3.5 |
| 4,003,629 A | 1/1977 | Baues et al. | 350/96 C |
| 4,006,963 A | 2/1977 | Baues et al. | 350/96 C |
| 4,018,228 A | 4/1977 | Goosen | 128/305 |
| 4,022,947 A | 5/1977 | Grubb et al. | 428/432 |
| 4,045,124 A | 8/1977 | Pollack et al. | 350/160 LC |
| 4,124,947 A | 11/1978 | Kuhl et al. | 40/453 |
| 4,210,132 A | 7/1980 | Perlin | 128/1 R |
| 4,368,736 A | 1/1983 | Kaster | 128/334 C |
| 4,374,371 A | 2/1983 | Narancic | 337/159 |
| 4,416,540 A | 11/1983 | Nicholson | 350/3.69 |
| 4,560,249 A | 12/1985 | Nishiwaki et al. | 350/162.17 |
| 4,673,241 A | 6/1987 | Nishiwaki et al. | 350/3.64 |
| 4,688,900 A | 8/1987 | Doane et al. | 350/347 V |
| 4,728,547 A | 3/1988 | Vaz et al. | 428/1 |
| 4,809,713 A | 3/1989 | Grayzel | 128/785 |
| 4,810,063 A | 3/1989 | Fergason | 350/347 V |
| 4,818,070 A | 4/1989 | Gunjima et al. | 350/334 |
| 4,832,424 A | 5/1989 | McGrew | 350/3.65 |
| 4,856,876 A | 8/1989 | Fergason | 350/350 F |
| 4,857,425 A | 8/1989 | Phillips | 430/1 |
| 4,891,152 A | 1/1990 | Miller et al. | 252/299.01 |
| 4,923,269 A | 5/1990 | Healey | 350/96.15 |
| 4,929,240 A | 5/1990 | Kirsch et al. | 606/151 |
| 4,930,674 A | 6/1990 | Barak | 227/179 |
| 4,938,568 A | 7/1990 | Margerum et al. | 350/334 |
| 4,942,102 A | 7/1990 | Keys et al. | 430/1 |
| 4,983,176 A | 1/1991 | Cushman et al. | 606/151 |
| 4,994,204 A | 2/1991 | Doane et al. | 252/299.01 |
| 5,003,386 A | 3/1991 | Doyle et al. | 358/90 |
| 5,011,624 A | 4/1991 | Yamagishi et al. | 252/299.5 |
| 5,014,709 A | 5/1991 | Bjelkhagen et al. | 128/654 |
| 5,015,249 A | 5/1991 | Nakao et al. | 606/142 |
| 5,047,039 A | 9/1991 | Avant et al. | 606/148 |
| 5,047,040 A | 9/1991 | Simpson et al. | 606/159 |
| 5,084,203 A | 1/1992 | Sansone et al. | 252/299.5 |
| 5,096,282 A | 3/1992 | Margerum et al. | 359/3 |
| 5,105,298 A | 4/1992 | Schellenberg | 359/3 |
| 5,136,666 A | 8/1992 | Anderson et al. | 385/24 |
| 5,144,690 A | 9/1992 | Domash | 385/12 |
| 5,166,813 A | 11/1992 | Metz | 359/15 |

(Continued)

FOREIGN PATENT DOCUMENTS

CA 544591 8/1957

(Continued)

OTHER PUBLICATIONS

Sutherland, Richard L., "Polarization and Switching Properties of Holographic Polymer-Dispersed Liquid-Crystal Gratings. I. Theoretical Model," *J. Opt. Soc. Am. B*, vol. 19, No. 12, pp. 2995-3003, Dec. 2002.

(Continued)

*Primary Examiner*—Shean C. Wu
(74) *Attorney, Agent, or Firm*—Kilpatrick Stockton LLP

(57) ABSTRACT

The process described herein offers the optimizing of performance parameters of holograms, such as reducing scattering effects in a polymer-dispersed liquid crystal optical element. In the process, an interfacial tension agent is added to a polymer-dispersed liquid crystal material. The polymer-dispersed liquid crystal material has at least one acrylic acid monomer, at least one type of liquid crystal material, a photoinitiator dye, and a co-initiator. The polymer-dispersed liquid crystal material is subjected to a polymerization. The interfacial tension agent reduces the size of liquid crystal droplets formed within the polymer-dispersed liquid crystal optical element during polymerization.

18 Claims, 3 Drawing Sheets

U.S. PATENT DOCUMENTS

| | | | |
|---|---|---|---|
| 5,170,925 A | 12/1992 | Madden et al. | 227/175 |
| 5,174,276 A | 12/1992 | Crockard | 128/4 |
| 5,182,180 A | 1/1993 | Gambogi, Jr. et al. | 430/1 |
| 5,182,665 A | 1/1993 | O'Callaghan et al. | 359/95 |
| 5,188,638 A | 2/1993 | Tzakis | 606/153 |
| 5,198,912 A | 3/1993 | Ingwall et al. | 359/3 |
| 5,210,630 A | 5/1993 | Heynderickx et al. | 359/106 |
| 5,220,928 A | 6/1993 | Oddsen et al. | 128/898 |
| 5,227,859 A | 7/1993 | Leib et al. | 556/347 |
| 5,227,906 A | 7/1993 | Tokumitsu | 359/117 |
| 5,234,447 A | 8/1993 | Kaster et al. | 606/153 |
| 5,235,445 A | 8/1993 | Hirai et al. | 359/52 |
| 5,240,636 A | 8/1993 | Doane et al. | 252/299.01 |
| 5,258,008 A | 11/1993 | Wilk | 606/219 |
| 5,264,950 A | 11/1993 | West et al. | 359/51 |
| 5,270,843 A | 12/1993 | Wang | 359/52 |
| 5,272,550 A | 12/1993 | Dickson et al. | 359/3 |
| 5,291,317 A | 3/1994 | Newswanger | 359/15 |
| 5,299,289 A | 3/1994 | Omae et al. | 359/95 |
| 5,303,322 A | 4/1994 | Winston et al. | 384/146 |
| 5,313,317 A | 5/1994 | Saburi et al. | 359/13 |
| 5,323,251 A | 6/1994 | Coates et al. | 359/51 |
| 5,328,800 A | 7/1994 | Yokoya et al. | 430/203 |
| 5,330,264 A | 7/1994 | Ando et al. | 359/12 |
| 5,330,486 A | 7/1994 | Wilk | 606/139 |
| 5,332,618 A | 7/1994 | Austin | 428/216 |
| 5,354,498 A | 10/1994 | Akashi et al. | 252/299.01 |
| 5,356,557 A | 10/1994 | Jubb et al. | 252/299.01 |
| 5,363,228 A | 11/1994 | DeJule et al. | 359/117 |
| 5,366,462 A | 11/1994 | Kaster et al. | 505/153 |
| 5,376,095 A | 12/1994 | Ortiz | 505/143 |
| 5,384,067 A | 1/1995 | Doane et al. | 252/299.01 |
| 5,453,338 A | 9/1995 | Suga et al. | 430/1 |
| 5,471,326 A | 11/1995 | Hall et al. | 359/15 |
| 5,488,681 A | 1/1996 | Deacon et al. | 385/37 |
| 5,499,118 A | 3/1996 | Wreede et al. | 359/12 |
| 5,529,861 A | 6/1996 | Redfield | 430/1 |
| 5,544,268 A | 8/1996 | Bischel et al. | 385/4 |
| 5,547,786 A | 8/1996 | Brandstetter et al. | 430/1 |
| 5,593,615 A | 1/1997 | Nerad et al. | 252/299.01 |
| 5,641,426 A | 6/1997 | Nerad et al. | 252/299.01 |
| 5,648,857 A | 7/1997 | Ando et al. | 359/12 |
| 5,661,533 A | 8/1997 | Wu et al. | 349/169 |
| 5,661,577 A | 8/1997 | Jenkins et al. | 359/11 |
| 5,680,233 A | 10/1997 | Faris et al. | 359/41 |
| 5,682,214 A | 10/1997 | Amako et al. | 349/74 |
| 5,695,682 A | 12/1997 | Doane et al. | 252/299.01 |
| 5,698,134 A | 12/1997 | Jubb et al. | 252/299.01 |
| 5,698,343 A | 12/1997 | Sutherland et al. | 430/1 |
| 5,706,375 A | 1/1998 | Mihailov et al. | 385/24 |
| 5,725,970 A | 3/1998 | Martin et al. | 430/2 |
| 5,731,853 A | 3/1998 | Taketomi et al. | 349/15 |
| 5,734,485 A | 3/1998 | Buchkremer et al. | 359/25 |
| 5,748,272 A | 5/1998 | Tanaka et al. | 349/86 |
| 5,751,452 A | 5/1998 | Tanaka et al. | 359/52 |
| 5,771,320 A | 6/1998 | Stone | 385/16 |
| 5,832,148 A | 11/1998 | Yariv | 385/16 |
| 5,852,504 A | 12/1998 | Kato et al. | 359/9 |
| 5,862,214 A | 1/1999 | Aggus et al. | 379/435 |
| 5,875,012 A | 2/1999 | Crawford et al. | 349/74 |
| 5,915,051 A | 6/1999 | Damask et al. | 385/16 |
| 5,930,011 A | 7/1999 | Gambogi, Jr. et al. | 358/15 |
| 5,937,115 A | 8/1999 | Domash | 385/16 |
| 5,942,157 A | 8/1999 | Sutherland et al. | 252/582 |
| 6,115,152 A | 9/2000 | Popovich et al. | 359/15 |
| 6,172,778 B1 | 1/2001 | Reinhorn et al. | 359/15 |
| 6,211,976 B1 | 4/2001 | Popovich et al. | 359/15 |
| 6,692,666 B2 | 2/2004 | Sutherland et al. | 252/582 |
| 6,699,407 B1 | 3/2004 | Sutherland et al. | 252/582 |
| 6,821,457 B1 | 11/2004 | Natarajan et al. | 252/582 |
| 6,867,888 B2 | 3/2005 | Sutherland et al. | 359/15 |
| 6,878,494 B2 | 4/2005 | Sutherland et al. | 430/2 |
| 7,018,563 B1* | 3/2006 | Sutherland et al. | 252/299.01 |
| 2002/0126332 A1 | 9/2002 | Popovich | 359/15 |

FOREIGN PATENT DOCUMENTS

| | | |
|---|---|---|
| DE | 44 08 746 A1 | 9/1995 |
| EP | 0 087 281 A1 | 8/1983 |
| EP | 0 422 689 A2 | 4/1991 |
| EP | 0 672 386 A1 | 9/1995 |
| EP | 0 856 765 A1 | 8/1998 |
| EP | 0 856 766 A2 | 8/1998 |
| EP | 0 856 768 A2 | 8/1998 |
| EP | 0 867 749 A2 | 9/1998 |
| GB | 2 222 696 | 3/1990 |
| GB | 2 281 566 | 3/1995 |
| GB | 2 292 745 | 3/1996 |
| JP | 60189729 A | 9/1985 |
| JP | 1-68784 A | 3/1989 |
| JP | 3-188479 A | 8/1991 |
| JP | 6-190185 | 4/1994 |
| JP | 10319237 | 12/1998 |
| SU | 1635966 | 3/1991 |
| WO | WO 81/00668 | 3/1981 |
| WO | WO 89/06264 | 7/1989 |
| WO | WO 94/04958 | 3/1994 |
| WO | WO 95/17127 | 6/1995 |
| WO | WO 97/27519 | 7/1997 |
| WO | WO 98/04650 | 2/1998 |
| WO | WO 99/09440 | 2/1999 |

OTHER PUBLICATIONS

Sutherland, Richard L., et al., "Polarization and Switching Properties of Holographic Polymer-Dispersed Liquid-Crystal Gratings. II. Experimental Investigations," *J. Opt. Soc. Am. B*, vol. 19, No. 12, 3004-3012, Dec. 2002.

Sutherland, Richard L., et al., "Evolution of Anisotropic Reflection Gratings Formed in Holographic Polymer-Dispersed Liquid Crystals," *Applied Physics Letters*, vol. 79, No. 10, pp. 1420-1422, Sep. 3, 2001.

Bowley, Chris C., "Variable-Wavelength Switchable Bragg Gratings Formed in Polymer-Dispersed Liquid Crystals," *Applied Physics Letters*, vol. 79, No. 1, pp. 9-11, Jul. 2, 2001.

"Handbook of Advanced Electronic and Photonic Materials and Devices," *Liquid Crystals, Display, and Laser Materials*, vol. 7, Academic Press, Cover, Copyright Page, Table of Contents (xiii-xvi), pp. 67-103, Copyright 2001.

Cramer, Neil B., et al., "Kinetics of Thiol-Ene and Thiol-Acrylate Photopolymerizations with Real-Time Fourier Transform Infrared," *Journal of Polymer Science: Part A: Polymer Chemistry*, vol. 39, pp. 3311-3319, 2001.

Warren, Garfield T., et al., "P-81: In-Situ Spectroscopy of Holographically Formed Polymer Dispersed Liquid Crystal Materials for High Performance Reflective Display Applications," *SID Digest of Technical Papers*, San Jose, pp. 866-869, 2001.

Sutherland, Richard L., "Switchable Holograms for Displays and Telecommunications," *Proceedings of SPIE*, vol. 4463, pp. 1-10, 2001.

Bowley, C. C., et al., "Improved Reflective Displays Based on Polymer-Dispersed Liquid Crystals," *J. Opt. Technol.*, vol. 67, No. 8, pp. 717-722, Aug. 2000.

Domash, L., et al., "Holographic PDLC for Photonic Applications," *Proceedings of SPIE*, vol. 4107, pp. 46-58, 2000.

Bunning, T. J., et al., "Holographic Polymer-Dispersed Liquid Crystals (H-PDLCs)," *Annu. Rev. Mater. Sci.*, vol. 30, pp. 83-115, 2000.

Cole, Michael C., "Photoinitiatorless Photopolymerizations Involving Monomers That Form Charge Trnasfer Complexes," *Radtech Technical Proceedings*, Tokyo, Japan, pp. 211-220, Dec. 2000.

R. T. Pogue, et al., "Monomer Functionality Effects in the Anisotropic Phase Separation of Liquid Crystals," *Polymer* 41, pp. 733-741, 2000.

Natarajan, L. V., et al., "Electrically Switchable Reflection Gratings in Polymer Dispersed Liquid Crystals," *Mat. Res. Soc. Symp. Proc.*, vol. 559, pp. 109-116, 1999.

Klosterman, A. M., et al., "Voltage Creep in Holographic PDLC Gratings," *Mat. Res. Soc. Symp. Proc.*, vol. 559, pp. 129-134, 1999.

C. C. Bowley, et al., "45.3: Electro-Optic Investigations of H-PDLCS: The Effect of Monomer Functionality on Display Performance," *SID International Symposium, Digest of Technical Papers*, First Edition, pp. 958-961, May 1999.

C. C. Bowley, et al., "Advances in Holographic Polymer Dispersed Liquid Crystal Technology," in *Liquid Crystal Materials and Devices*, Mat. Res. Soc. Symposium Proceedings, vol. 559, pp. 97-107, 1999.

M. Date, et al., "Full-Color Reflective Display Device Using Holographically Fabricated Polymer-Dispersed Liquid Crystal (HPDLC)," *Journal of the Society for Information Display (SID)*, vol. 7, pp. 17-22, 1999.

M. Escuti, et al., "5.3: A Model of the Fast-Switching Polymer-Stabilized IPS Configuration," *SID International Symposium, Digest of Technical Papers*, First Edition, pp. 32-35, May 1999.

Seferis, James C., "Refractive Indices of Polymers," *Polymer Handbook*, 4th Edition, John Wiley & Sons, Inc., pp. 571-582, Copyright 1999.

C. C. Bowley, et al., "Morphology of Holographically-Formed Polymer Dispersed Liquid Crystals (H-PDLC)," *Mol. Cryst. Liq. Cryst.*, vol. 331, pp. 209-216, 1999.

J. A. Firehammer, et al., "Lasing Pixels: A New Application for Polymer Dispersed Liquid Crystals (PDLCs)," *Mol. Cryst. Liq. Cryst.*, vol. 331, pp. 165-172, 1999.

Richard L. Sutherland, et al., "Switchable Holograms for Displays and Other Applications," *SPIE Proceedings*, vol. 3421, pp. 8-18, Jun. 1998.

L. V. Natarajan, et al., "Holographic PDLCs for Optical Beam Modulation, Deflection, and Dynamic Filter Applications," *SPIE Proceedings*, vol. 3292, pp. 44-51, Jan. 28-29, 1998.

K. Thilo Weitzel,et al., "Hologram Recording in DuPont Photopolymer Films by Use of Pulse Exposure," *Optics Letter*, vol. 22, No. 24, Dec. 15, 1997.

L. V. Natarajan, et al., "Electrically Switchable Holograms Containing Novel PDLC Structures," *SPIE Proceedings*, vol. 3143, pp. 182-190, Jul. 28-29, 1997.

N. M. Lawandy, et al., "L1.3: Lasing Pixel PDLC Light Valves for Projection Applications," *SID International Symposium, Digest of Technical Papers*, First Edition, pp. 1001-1004, May 1997.

G. P. Crawford, et al., "Reflective Color LCDs based on H-PDLC and PSCT Technologies," *Journal of the Society for Information Display*, vol. 5, No. 1, pp. 45-48, 1997.

Montemazzani, G., et al., "Light Diffraction at Mixed Phase and Absorption Gratings in Anisotropic Media for Arbitrary Geometries," *Physical Review E*, vol. 55, No. 1, pp. 1035-1047, Jan. 1997.

Tondiglia, V. P., et al., "Effects of Varying Surfactants on the Electro-Optical Switching Characteristics of Volume Holograms Recorded in PDLC's," *Mat. Res. Soc. Symp. Proc.*, vol. 479, pp. 235-240, 1997.

V. N. Mikhailov, et al., "Pulse Hologram Recording in DuPont's Photopolymer Films," *SPIE*, vol. 3011, pp. 200-202, 1997.

D. Schwarze-Haller and F. Noack, "Nuclear Magnetic Resonance Field-Cycling Proton Relaxation Study of Polymer Dispersed Liquid Crystals," *J. Chem. Phys.*, vol. 105, No. 11, pp. 4823-4832, Sep. 1996.

G. P. Crawford, et al., "Reflective Color LCDs Based on H-PDLC and PSCT Technologies," *SID International Symposium, Digest of Applications Papers*, pp. 99, May 14-16, 1996.

Lawrence H. Domash, et al., "Switchable-Focus Lenses in Holographic Polymer Dispersed Liquid Crystal," *SPIE*, vol. 2689, pp. 188-194, May 1996.

Richard L. Sutherland, et al., "The Physics of Photopolymer-Liquid Crystal Composite Holographic Gratings," *SPIE Proceedings*, vol. 2689, pp. 158-169, May 1996.

T. J. Bunning, et al., "Switchable Bragg Gratings Formed *in situ* Within a Polymer Dispersed Liquid Crystal Composite Medium," *Materials Research Society*, pp. 331-343, Apr. 8-11, 1996.

Timothy J. Bunning, et al., "The Effects of Eliminating the Chain Extender and Varying the Grating Periodicity on the Morphology of Holographically Written Bragg Gratings," *SPIE Proceedings*, vol. 2651, pp. 44-54, Jan. 31-Feb. 1, 1996.

T. J. Bunning, et al., "Morphology of Reflection Holograms Formed *in situ* Using Polymer-Dispersed Liquid Crystals," *Polymer*, vol. 37, No. 14, pp. 3147-3150, 1996.

G. S. Iannacchione, et al., "Deuterium NMR and Morphology Study of Polymer-Dispersed Liquid-Crystal Bragg Gratings," *Europhysics Letters*, vol. 36, No. 6, pp. 425-430, 1996.

L. V. Natarajan, et al., "Electro-Optical Switching Characteristics of Volume Holograms in Polymer Dispersed Liquid Crystals," *Journal of Nonlinear Optical Physics and Materials*, vol. 5, No. 1, pp. 89-98, Jan. 1996.

R. L. Sutherland, et al., "Switchable Bragg Gratings Formed *in situ* Within a Polymer-Dispersed Liquid Crystal Composite Medium," *Materials Research Society Symp. Proc.*, vol. 425, pp. 331-341, Apr. 8-11, 1996.

Richard L. Sutherland, et al., "Analysis of Periodic Polymer-Dispersed Liquid Crystal Structures for Dynamic Hologram Applications," *SPIE Proceedings*, vol. 2532, pp. 309-318, Jul. 10-12, 1995.

V. P. Tondiglia, et al., "Volume Holographic Image Storage and Electro-Optical Readout in a Polymer-Dispersed Liquid Crystal Film," *Optics Letters*, vol. 20, No. 11, pp. 1325-1327, Jun. 1, 1995.

Richard L. Sutherland, et al., "Switchable Holograms in New Photopolymer-Liquid Crystal Composite Materials," *SPIE Proceedings*, vol. 2404, pp. 132-143, Feb. 9-10, 1995.

Drzaic, P. S., "Phase Separation Methods for PDLC Films," in *Liquid Crystal Dispersions, World Scientific*, Singapore, pp. 30-59, 1995.

N. Kawatsuki and H. Ono, "Electro-Optical Properties of Polymer/(Liquid Crystal) Composite Film Fabricated by Two-Step Phase Separation Method," *Chemistry Letters*, No. 5, pp. 333-334, 1995.

T. J. Bunning, et al., "The Morphology and Performance of Holographic Transmission Gratings Recorded in Polymer Dispersed Liquid Crystals," *Polymer*, vol. 36, No. 14, pp. 2699-2708, 1995.

R. L. Sutherland, et al., "Electrically Switchable Volume Gratings in Polymer-Dispersed Liquid Crystals," *Appl. Phys. Lett.*, vol. 64, No. 9, pp. 1074-1076, Feb. 28, 1994.

Richard L. Sutherland, et al., "Development of Photopolymer-Liquid Crystal Composite Materials for Dynamic Hologram Applications," *SPIE Proceedings*, vol. 2152, pp. 303-313, Jan. 26-28, 1994.

K. Tanaka, et al., "Holographically Formed Liquid-Crystal/Polymer Device for Reflective Color Display," *Journal of the Society for Information Display*, vol. 2, No. 1, pp. 37-38, 1994.

L. Domash, et al., "Programmable Beamlet Generator, Dynamic Lens, and Optical Memory Using Electrically Switched Holographic Devices," *SPIE Proceedings*, vol. 2026, pp. 642-652, Nov. 1993.

Jacobine, A. F., "Thiol-Ene Photopolymers (Chapter 7)," in *Radiation Curing in Polymer Science and Technology—vol. III, Polymerization Mechanisms*, Elsevier Applied Science, Cover Page, Copyright Page, Table of Contents (v-vi), pp. 219-268, Copyright 1993.

D. J. Lougnot, et al., "Photopolymers for Holographic Recording: IV. New Self-Processing Formulations Based on β-Hydroxy Ethyloxazolidone Acrylate," *Pure Appl. Opt.*, vol. 2, pp. 383-392, 1993.

R. L. Sutherland, et al., "Bragg Gratings in an Acrylate Polymer Consisting of Periodic Polymer-Dispersed Liquid Crystal Planes," *Chem. Mater.*, vol. 5, No. 10, pp. 1533-1538, 1993.

H. I. Bjelkhagen, et al., "High-Resolution Contact Denisyuk Holography," *Applied Optics*, vol. 31, No. 8, pp. 1041-1047, Mar. 10, 1992.

Hideya Murai, et al., "Electro-Optic Properties for Liquid Crystal Phase Gratings," *SPIE Proceedings*, vol. 1665, pp. 230-239, Feb. 11-13, 1992.

Lawrence H. Domash, "Applications of Dynamic Holograms for Quasi-Volume Storage," *SPIE Proceedings, Very Large Optical Memories-Materials and System Architectures*, vol. 1773, 5 pp., 1992.

Richard T. Ingwall and Timothy Adams, Hologram: Liquid Crystal Composites, *SPIE Proceedings*, vol. 1555, pp. 279-290, Jul. 24-25, 1991.

Luck, Russell M., et al., "Shrinkage in Conventional Monomers During Polymerization (Chapter 1)," in *Expanding Monomers: Synthesis, Characterization, and Applications*, CRC Press, Inc., Cover Page, Copyright Page, Table of Contents (1 p.), 1-61.

R. L. Sutherland, "Optical Limiters, Switches, and Filters Based on Polymer Dispersed Liquid Crystals," *SPIE Proceedings*, vol. 1080, pp. 83-90, Jan. 17-18, 1989.

A. M. Lackner, et al., "Droplet Size Control in Polymer Dispersed Liquid Crystal Films," *SPIE Proceedings*, vol. 1080, pp. 53-61, Jan. 17-18, 1989.

Yamagishi, Frederick G., et al., "Morphological Control in Polymer-Dispersed Liquid Crystal Film Matrices," *SPIE*, vol. 1080, pp. 24-31, 1989.

Wu, Bao-Gang, et al., "Response Times and Voltages for PDLC Light Shutters," *Liquid Crystals*, vol. 5, No. 5, pp. 1453-1465, 1989.

Smith, G. W., et al., "The Interfacial Free Energy of Nematogen Droplets in an Isotropic Matrix: Determination of its Temperature Dependence from Coalescence Kinetics," *Mol. Cryst. Liq. Cryst.*, vol. 174, pp. 49-64, 1989.

G. von Bally, et al., "Gradient-Index Optical Systems in Holographic Endoscopy," *Applied Optics*, vol. 23, No. 11, pp. 1725-1729, Jun. 1, 1984.

Allan R. Tokuda, et al., "Holocamera for 3-D Micrography of the Alert Human Eye," *Applied Optics*, vol. 19, No. 13, pp. 2219-2225, Jul. 1, 1980.

Stephen A. Benton, et al., "One-Step White-Light Transmission Holography," *SPIE*, vol. 215, pp. 156-161, 1980.

Stephen A. Benton, et al., "One-Step White-Light Transmission Holography," *SPIE*, vol. 212, pp. 2-7, 1979.

Hori, Asai, and Fukai, "Field-Controllable Liquid-Crystal Phase Grating," *IEEE*, vol. ED-16, p. 1734 (4 pp.), 1979.

Edited by H. Bennett, "Cooncise Chemical and Technical Dictionary, FAIC" Chemical Publishing Co., Inc., 1974.

R. A. Kashnow and J. E. Bigelow, "Diffraction From a Liquid Crystal Phase Grating," *Applied Optics*, vol. 12, No. 10, pp. 2302-2304, Oct. 1973.

Kogelnik, Herwig, "Coupled Wave Theory for Thick Hologram Gratings," *The Bell System Technical Journal*, vol. 48, No. 9, pp. 2909-2947, Nov. 1969.

Stoke, Funkhouser, Leonard, Indebetoew, and Zech, "Hand-Held Holography," 1 p., Sep. 19, 1966.

G. W. Stroke and A. E. Labeyrie, "White-Light Reconstruction of Holographic Images Using the Lippmann-Bragg Diffraction Effect," *Physics Letters*, vol. 20, No. 4, pp. 368-370, Mar. 1, 1966.

* cited by examiner

TAILORING MATERIAL COMPOSITION FOR OPTIMIZATION OF APPLICATION-SPECIFIC SWITCHABLE HOLOGRAMS

CROSS-REFERENCE TO RELATED APPLICATIONS

This application is a continuation of U.S. patent application Ser. No. 10/303,927, filed Nov. 26, 2002 now U.S. Pat. No. 7,018,563, which is hereby incorporated by reference in its entirety. This application also incorporates by reference in their entirety the following United States Patent Applications similarly titled "SWITCHABLE VOLUME HOLOGRAM MATERIALS AND DEVICES": Ser. No. 09/033,512 filed Mar. 2, 1998, now U.S. Pat. No. 6,699,407; Ser. No. 09/033,513 filed Mar. 2, 1998; Ser. No. 09/033,514 filed Mar. 2, 1998, now U.S. Pat. No. 6,677,086; Ser. No. 09/034,014 filed Oct. 29, 1999, now U.S. Pat. No. 6,706,451; Ser. No. 09/429,645 filed Mar. 21, 1998, now U.S. Pat. No. 6,667,134; and Ser. No. 09/347,624 filed Jul. 2, 1999, now U.S. Pat. No. 6,692,666. Also incorporated herein by reference in their entireties are U.S. patent application Ser. No. 09/742,397 filed on Dec. 22, 2000 entitled "SWITCHABLE POLYMER-DISPERSED LIQUID CRYSTAL OPTICAL ELEMENTS," and 09/577,166 filed on May 24, 2000, now U.S. Pat. No. 6,730,442, entitled "A SYSTEM AND METHOD FOR REPLICATING HOLOGRAMS."

BACKGROUND OF THE INVENTION

1. Field of the Invention

The present invention relates generally to photopolymerizable materials, and more specifically to polymer-dispersed liquid crystal materials in which the switchable hologram performance parameters are subject to control and optimization.

2. Description of the Related Art

Demand for information has become a strong driver in many business, consumer, and government applications. Three key components of this demand are the storage, transmission, and display of information. The latter two in particular are placing severe demands on available hardware and software. In communications, there has been an explosion of traffic driven by the Internet, business data, and digital image transfers. In the end-point use of this huge data stream, visual utilization and management of data have high priority. Large data content requires high resolution (super video graphics array ("SVGA") to extended graphics array ("XGA")) along with full-color capability. The technological response to these challenges has spawned several innovations. For telecom applications, part of the response is to provide higher data rates and bandwidth extension through the use of dense wavelength division multiplexing (DWDM). For easy visual access to information, portable and handheld devices are evolving along with flat screens and personal displays. In addition, efforts are underway to make the advantages of digital video disc ("DVD") and high definition television ("HDTV") available in these formats.

Optics is at the core of all of these technologies. The information revolution is placing stringent demands on several optical components. For example, short- and long-period fiber Bragg gratings are playing key roles in the telecom industry, but the demand for multiple wavelengths and the ability for dynamic reconfiguration by DWDM is growing. In information display applications, the use of portable and micro-displays, combined with virtual display technology, is creating the need for complex off-axis optical systems in very compact, lightweight packages. This becomes impossibly heavy and cumbersome with conventional refractive and reflective optics.

Diffractive optics is the natural response to many of these demands. But these devices are by their very nature monochromatic. Multi-wavelength and dynamic reconfiguration capabilities are forcing a reconsideration of the use and fabrication of diffractive optical elements to satisfy the growing needs of the information revolution.

This revolution is creating demands for efficiency across a wide-range of applications. An approach developed to achieve such efficiency is through application specific performance, focusing on the parameters important for individual applications. Among these applications are: fiber optic switches; reprogrammable N×N optical interconnects for optical computing; beam steering for laser surgery; beam steering for laser radar; holographic image storage and retrieval; digital zoom optics (switchable holographic lenses); graphic arts and entertainment; and the like.

Switchable holographic optical elements (HOEs) have been invented to fulfill the promise of diffractive optics in meeting the technological challenges in telecom and information display. Multi-layered switchable holographic optical elements in a single solid-state device form a substitute for multiple static elements and complex refractive/reflective optical systems.

A hologram is an interference pattern that is recorded on a high-resolution recording plate. Two beams formed by a coherent beam from a laser interfere within the recording plate, causing an interference pattern. This pattern represents object information. The object information is a function of the light diffracted from the object to be recorded when the object is placed in the path of one of the two formation beams. If the resulting recording plate is viewed correctly in monochromatic light, a three-dimensional image of the object—a hologram—is seen. When forming a holographic grating, there is no object, per se, which is put into the path of one of the beams. Instead, given the wave properties of light, when two beams interact, they will form a grating within the recording plate. This grating can be formed so as to have any of a variety of characteristics.

SUMMARY OF THE INVENTION

Summary of the Problem

Switchable hologram technology must present a flexible approach to optical element design and fabrication, offering high efficiency and optical quality with low power consumption. Moreover, it must be tailored to customer specifications, i.e., it has to be very application-specific. For example, devices in telecom applications that require specific wavelength and format consideration include reconfigurable add/drop switches, multiplexers, optical cross connects, optical switches, wavelength selectors and tuners, and spectral attenuators or gain flatteners. Examples of such needs also abound in the information display area, including personal DVD/HDTV viewers, portable displays, data phone/handheld Internet displays, wearable PC displays, digital picture frames, desktop telephone E-mail/Internet displays, ultraportable projection systems, and desktop monitors.

As the switchable holographic materials and devices discussed herein near application in the markets discussed herein, it has become clear that several performance parameters are critical. In particular, parameters require control and independent optimization for devices to meet the demanding requirements of anticipated applications in the telecom and display industries. It is just such control and optimization that will tailor properties of switchable HOEs for the application-specific needs of customers. Most of these parameters relate to intrinsic properties of materials and/or processes. These considerations go beyond obvious modifications of materials and devices. For example, it is well known in the art that the thickness of a switchable hologram can be modified to either increase diffraction efficiency or reduce switching voltage. There is, of course, a trade-off because one case involves increasing the thickness while the other requires a decrease in thickness.

In many applications with holograms, haze is a problem. In polymer-dispersed liquid crystal ("PDLC") holograms haze is produced by light scattering from inhomogeneities in the film. Some of these are contaminants that can be controlled by careful processing. Others originate from phase-separated LC droplets. The diffraction planes themselves will produce some random scattering due to nonuniform distributions of LC droplets from plane to plane. But a major source of scattering comes from phase-separated droplets that occur outside the desired Bragg planes. Examples of this are cross-gratings and diffraction rings formed by spurious reflections and diffraction of the recording beams. Also, in some cases, LC may randomly phase separate in the polymer-rich regions. Scattering is a strong function of droplet size and density. A haze as large as 10% has been measured. It is strongly desired to reduce and control the amount of haze in holograms for specific applications.

In electrically switchable holograms, power dissipation is another parameter of interest. When high, it can lead to joule heating, which in some cases can cause problems with thermal stability. Large power consumption requires a more expensive electrical power supply. It can also require larger voltages, which may lead to electrical shorting that destroys the usefulness of the hologram. This depends largely on the switching voltage—high switching voltage leads to large current drawn from the power supply. In switchable PDLC gratings, power consumption and dissipation comes from current drawn to charge up the transparent electrodes, and resistive heating in the transparent electrodes and through the hologram (due to a finite conductivity of the PDLC material).

Thermal stability of holographic PDLC ("H-PDLC") material is also a problem. Above the liquid crystal nematic-to-isotropic (N-I) transition temperature there is reduced diffraction efficiency for the H-PDLC, but the index mismatch cannot be removed by application of an electric field. Upon reducing the temperature below the N-I transition the DE is restored to its maximum value and the grating can be switched clear by applying a field. Factors such as usage environment, source temperature, or optimal operating temperatures for certain applications have led to a need for better understanding of the H-PDLC performance at elevated temperature. Furthermore, some applications require that they perform continuously at elevated temperatures whereas others require that the H-PDLCs do not fall below certain minimum specifications over an extended range of temperatures. Commercially available LC mixtures are typically eutectic solutions that are formulated to provide a broad nematic temperature range. However, some LCs perform better than others as the typical operating temperature is raised. For example, when a stack of reflection gratings is subjected to an intense broadband source of light, the source produces a significant heat load such that, even after extensively filtering the source to reduce infrared radiation, the temperature of the filters is well above ambient. It is strongly desired to develop H-PDLC material with good and/or variable thermal stability.

Tanaka et al. (K. Tanaka et al., U.S. Pat. Nos. 5,751,452 and 5,748,272) teach an optical device made from a switchable holographic PDLC grating and methods for fabricating the same. They provide little detail about materials or methods other than standard holographic methods well known by those practicing the art. They do teach use of NOA65 (polyene and polythiol mixture), but not how it may be used in conjunction with a multifunctional acrylate to reduce switching voltage and significantly reduce voltage creep. NOA65 is the only polymerizable monomer in the Tanaka et al. system; Tanaka et al. provides nothing new over prior art (see Margerum et al., U.S. Pat. Nos. 4,938,568 and 5,096,282).

Crawford et al. (G. P. Crawford et al., U.S. Pat. No. 5,875,012, and European Patent Applications #98300541.1, #98300543.0, #98300468.0) teach reflective displays made with switchable PDLC holograms, but provide little in the way of materials or methods for optimizing performance. They teach the use of an anisotropic polymer index-matched to the liquid crystal (LC) to reduce haze at large viewing angles. Crawford et al. provide nothing new over prior art in PDLCs (see Doane et al., U.S. Pat. Nos. 4,994,204 and 5,240,636).

Taketomi et al. (Taketomi et al., U.S. Pat. No. 5,731,853) and Ninomiya et al. (Ninomiya et al., U.S. Pat. No. 6,083,575) teach devices made with switchable PDLC holograms, but provide no teaching for optimizing switchable hologram performance.

These considerations are well known, but the prior art has not addressed specific intrinsic material compositions or processing control parameters, or other external controls, that can systematically optimize these parameters to meet the specific requirements of various applications. In fact, independent and optimal control of all of these parameters is just what is required to tailor the material and device properties to application-specific situations. How this may be achieved has not been described in the art. The embodiments of the present invention described herein detail compositions and methods for precise control and optimization of parameters specific to individual applications.

Summary Solution

PDLC holographic materials described herein offer a solution to the need for an electronically driven, multi-layer, multi-wavelength, complex optical system in a thin, lightweight, low-electrical-power element.

Embodiments of the present invention provide material formulations for improving the performance of polymer-dispersed liquid crystal (PDLC) holograms in application-specific situations.

According to particular embodiments of the present invention, a second monomer, in proper relative concentration with the multifunctional primary monomer, combined with a second phase separation is used to achieve improved switching and voltage creep performance.

According to further embodiments of the present invention, haze is addressed without the need for relying on anisotropic properties of the host polymer.

Particular embodiments of the current invention also use multi-functional acrylates which form a three-dimensional network with elastic properties resulting in desired LC properties. The LC can be squeezed into a separate phase yielding desirable optical properties for the hologram. The multi-functionality also leads to continual post-polymerization after the hologram recording is completed which stiffens the matrix and increases the switching voltage (i.e., voltage creep). The elastic relaxation of the multi-functional acrylate system also produces another phenomenon: shrinkage. Shrinkage has a major effect in a direction parallel to the grating vector and thus—in reflection gratings—this reduces the grating period. Controlling shrinkage in the plane of the hologram can prevent "wrinkling" of the hologram and therefore precludes certain defects in the surface of the hologram.

Further embodiments of the present invention include wavelength selective optical elements formed by processes and materials that are tailored so as to adjust and achieve desired performance parameters. The adjustable parameters include haze, switching voltage, electrical power dissipation, switching stability, switching contrast ratio, environmental stability and operating temperature range.

BRIEF DESCRIPTION OF THE FIGURES

The present invention will be more clearly understood from a reading of the following description in conjunction with the accompanying figures wherein.

DETAILED DESCRIPTION OF THE PREFERRED EMBODIMENTS OF THE PRESENT INVENTION

Figure 1B:
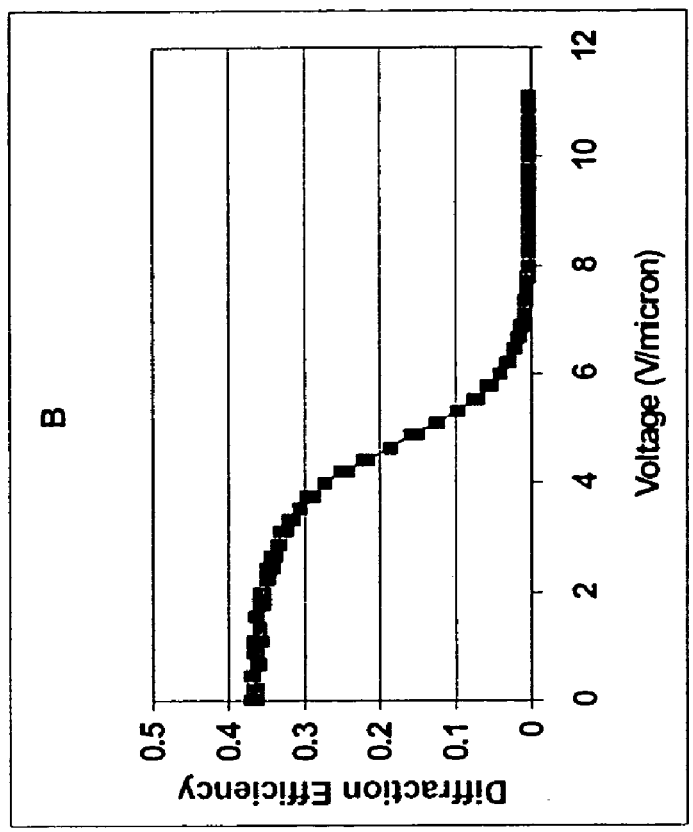
FIGS. 1A and 1B show a switching field comparison for a reflection grating formulated without a secondary monomer (FIG. 1A) and with a secondary monomer (FIG. 1B) according to an embodiment of the present invention.

As switchable holographic materials and devices near application in the markets discussed above, it has become clear that several performance parameters are critical. Specifically, parameters listed in Table 1 require control and independent optimization for devices to meet the demanding requirements of anticipated applications in the telecom and display industries. Such control and optimization of switchable HOEs properties will result in products able to meet the application-specific needs of customers. The embodiments described herein describe the precise control and optimization of parameters specific to individual applications. Such tailoring is achieved via variation of the qualities listed in Table 1 through a combination of material compositions and control of molecular diffusion, phase separation, morphology, and other processing aspects during the fabrication of switchable holograms.

TABLE 1

| Performance Parameters | Materials/Process Control |
| --- | --- |
| Haze | LC droplet size |
| Switching voltage (electric field) | Matrix conductivity |
| | LC/polymer interfacial elasticity |
| Electrical power dissipation | Matrix conductivity |
| Switching stability (voltage creep) | LC/polymer interfacial elasticity |
| Switching contrast ratio | Matrix index |
| (dynamic range) | LC ordinary index |
| Environmental stability | High N-I temperature LC |
| Operating temperature range | Wide temperature range LC |
| | Diluent concentration |

A basic component of the optical elements described within this disclosure is the PDLC material used therein. A general description of the ingredients which comprise this PDLC material—and various specific examples of combinations of these ingredients used to form specific types of PDLC materials—are discussed below. The PDLC material generally comprises a monomer, a dispersed liquid crystal, a cross-linking monomer, a coinitiator and a photoinitiator dye. These PDLC materials exhibit clear and orderly separation of the liquid crystal and cured polymer, whereby the PDLC material advantageously provides high quality holographic gratings. The PDLC materials of the present invention are also advantageously formed in a single step. The present invention also utilizes a unique photopolymerizable prepolymer material that permits in situ control over characteristics of the resulting gratings, such as domain size, shape, density, ordering, and the like. Also, methods and materials of the present invention can be used to prepare PDLC materials that function as switchable transmission or reflection gratings.

PDLC materials, methods, and devices contemplated for use in the practice of the present invention are also described in R. L. Sutherland et al., "Bragg Gratings in an Acrylate Polymer Consisting of Periodic Polymer-Dispersed Liquid-Crystal Planes," Chemistry of Materials, No. 5, pp. 1533–1538 (1993); in R. L. Sutherland et al., "Electrically switchable volume gratings in polymer-dispersed liquid crystals," Applied Physics Letters, Vol. 64, No. 9, pp. 1074–1076 (1984); and T. J. Bunning et al., "The Morphology and Performance of Holographic Transmission Gratings Recorded in Polymer-dispersed Liquid Crystals," Polymer, Vol. 36, No. 14, pp. 2699–2708 (1995), all of which are fully incorporated by reference into this Detailed Description. Also incorporated by reference herein are U.S. Pat. Nos. 5,942,157 and 5,698,343.

The process by which a hologram is formed according to the invention is controlled primarily by the choice of components used to prepare the homogeneous starting mixture (hereafter "syrup"), and by the intensity of the incident light pattern. A preferred PDLC material employed in the practice of the present invention creates a switchable hologram in a single step. The resulting preferred PDLC material has an anisotropic spatial distribution of phase-separated LC droplets within the photochemically cured polymer matrix. The features of the PDLC material are also influenced by the components used in the preparation of the homogeneous starting mixture and by the intensity of the incident light pattern. In a preferred embodiment, the prepolymer material comprises a mixture of a photopolymerizable monomer, a second phase material, a photoinitiator dye, a coinitiator, a chain extender (or cross-linker), and, optionally, a surfactant. Highly functionalized monomers are also preferred because the extensive cross-linking associated with such monomers yields fast kinetics. Highly functionalized monomers, however, are relatively viscous. As a result, these monomers do not tend to mix well with other materials, and they are difficult to spread into thin films. One preferred embodiment of the present invention uses a mixture of acrylates. Suitable acrylates, such as triethyleneglycol diacrylate, trimethylolpropane triacrylate, pentaerythritol triacrylate, pentaerythritol tetraacrylate, pentaerythritol pentaacrylate, and the like can be used in accordance with the present invention. The second phase material of choice for use in the practice of the present invention is a LC. This also allows an electro-optical response for the resulting hologram. Preferred PDLC materials are discussed in detail in United States Patent Applications entitled SWITCHABLE POLYMER-DISPERSED LIQUID CRYSTAL OPTICAL ELEMENTS and A SYSTEM AND METHOD FOR REPLICATING VOLUME HOLOGRAMS incorporated by reference above.

The material comprising this invention is a mixture of a polymerizable monomer and liquid crystal, along with other ingredients, including a photoinitiator dye. Upon irradiation, the liquid crystal separates as a distinct phase of nanometer-size droplets aligned in periodic channels forming the hologram. The material is called a holographic polymer-dispersed liquid crystal ("H-PDLC"). Both transmission and reflection type holograms may be formed with H-PDLCs. One skilled in the art recognizes that the same concepts embodied in this disclosure are viable for other applications, including those for communications switches, switchable transmission and reflection lenses (red, green, and blue). Preferred embodiments of the present invention use a PDLC material and its unique switching characteristics to form optical elements. The PDLC material of the present invention offers all of the features of holographic photopolymers plus the hologram can be switched on and off with the application of an electric field. Most importantly, additional advantages include control over the following parameters: 1) haze, 2) switching voltage, 3) electrical power dissipation, 4) switching stability (i.e., voltage creep), 5) switching contrast ratio (i.e., dynamic range), 6) dynamic stability, and 7) the operating temperature range.

Some aspects of the present invention include a homogeneous mixture of ingredients (i.e., syrup) given generically by the following: one or more polymerizable monomers (mixture of multi-functional acrylates, including at least a pentaacrylate), a LC (typically a mixture of cyanobiphenyls), a photoinitiator dye (one dye with absorption spectrum overlapping recording laser wavelength), a co-initiator, a reactive diluent or cross-linking agent, and, optionally, a surfactant or surfactant-like additive. When this system is irradiated holographically, the photoinitiator absorbs light in the bright fringes and reacts with the co-initiator, creating free radicals. The free radicals then initiate polymerization of the multi-functional acrylates. The free-radical process is very fast, and a three-dimensional polymer network is created in just a few seconds. This rapid development of a densely cross-linked network is critical to the phase separation of LC droplets in the dark fringes, which is what establishes the hologram. Highly functional acrylates are needed to produce this with a minimum of exposure time. The surfactant contributes to matrix conductivity and the reduction of LC/polymer anchoring, thereby reducing the switching voltage. However, it also acts as a diluent to the LC, reducing its order parameter and lowering the nematic-isotropic transition temperature. This can dramatically affect the temperature stability of the hologram.

In an embodiment of the present invention, multi-functional acrylates are used. They form a three-dimensional network with elastic properties which can cause "squeezing" of the LC—this squeezing causes the LC to move into a separate phase yielding desirable optical properties for the hologram. The strong elastic forces involved make the polymer matrix very stiff which adds to a high switching voltage for the H-PDLC hologram. The multi-functionality leads to continual post-polymerization in the dark after the hologram recording is completed which further stiffens the matrix and causes "voltage creep"—a slow increase in the switching voltage. In some cases it can increase the switching voltage by as much as 100%.

In many applications with holograms, haze is a problem. The present invention improves haze produced by light scattering from inhomogeneities in the PDLC film. Some embodiments of the present invention combat scattering associated with phase-separated droplets that occur outside the desired Bragg planes. Scattering is a strong function of droplet size and density. Switching speed requirements will depend on the application. Some applications may require on/off-switching times in the microsecond regime, while some may only require millisecond response. It is useful to be able to tailor the switching speed to the application to optimize other parameters, such as switching voltage. Embodiments of the present invention retain desirable attributes of the multi-functional acrylate system for forming PDLC holograms, but add new materials to the syrup or new process controls to recording to optimize performance parameters as may be needed for specific applications. This results in high optical quality switchable holograms with good diffraction efficiency and low, stable switching voltage.

In one embodiment of the present invention, the hologram material allows control over the amount of scattering via control of the LC droplet size. Droplet size a impacts scattering loss; at any wavelength, the scattering coefficient increases with size approximately as $a^3$. There is also a trade-off of switching voltage with relaxation time. (See Equations (1) and (2)). It is desirable to keep a as small as possible. Since scattering and relaxation time are approximately proportional to $a^3$ and $a^2$, respectively, while switching voltage is proportional to $a^{-1}$, much may be gained by minimizing a. But this will begin to increase switching voltage unfavorably (even when optimizing matrix conductivity and interfacial anchoring see below). At some point it is desirable to offset decreases in a with some other parameter.

In this embodiment, reducing LC droplet size is achieved by lowering the interfacial tension between the LC and the surrounding polymer. Reducing the interfacial tension lowers the amount of work required to produce droplets of high surface area-volume ratio when the LC drops out of the polymer network as a separate phase. This can be controlled with the addition of an interfacial tension agent to the starting syrup. Agents incorporating a hydroxyl group are desired because they may readily form hydrogen bonds with side chains of the acrylate polymer. The other end of the molecule should mix well with the LC. Hydrocarbon chains perform this well because LCs also have long hydrocarbon chains. Linear and/or branched acids of the type $C_nH_{(2n+1)}COOH$ with $n \leq 18$ are effective as interfacial tension agents. With interfacial tension agent concentrations up to about 10 wt-%, LC droplets decrease in diameter monotonically and droplets in samples containing no interfacial agent were ~100–150 nm in diameter. However, samples containing 4–6 wt-% of interfacial agent had smaller droplet diameters (~20–40 nm dia.). Higher concentrations have produced droplet diameters as small as 10 nm. Usually, as the agent concentration is increased, droplet size decreases drastically and is not easily detected using scanning electron microscopy. Switching voltages also increase dramatically, indicating very small droplet diameters (i.e., <<10 nm). Much research has focused on analyzing the optimal concentrations of various interfacial tension agents on both optical quality and switching properties. Concentrations in the 2–7 wt-% range are useful for a variety of organic acids, but the principle of this invention is not necessarily limited to the use of acids. Other polar molecules that are preferentially attracted to the oxygen in the acrylate side chain and have long hydrocarbon chains compatible with the LC also function as effective interfacial tension agents for controlling LC droplet size.

In a further embodiment of the present invention, switching voltage is reduced through the addition of an additive monomer acrylate, e.g., branched alkyl chains, to the H-PDLC material. Branched alkyl chains containing acrylates such as t-butyl acrylate, t-butyl methacrylate, isopropyl acrylate, and isopropyl methacrylate, lower the surface anchoring interactions with the liquid crystal due to the steric effect imposed by the bulky alkyl groups close to the vinyl double bond. As a result, the LC droplets are less strongly bound to the polymer surface enabling the reorientation of the LC droplet when an electric field is applied, thus reducing the amount of required switching voltage.

In another embodiment of the present invention, the H-PDLC material allows control over the switching voltage via control of the conductivity of the matrix. The switching and voltage creep phenomena are best discussed in the context of a simple model. The switching voltage of a switchable hologram is related to the critical electric field ($E_c$) necessary to reorient the LCs. This critical field can be estimated by the following equation:

$$E_c = \frac{1}{3a}\left(\frac{\sigma_{LC}}{\sigma_p}+2\right)\left[\frac{\bar{k}(l^2-1)}{\Delta\varepsilon}\right]^{\frac{1}{2}} \quad (1)$$

Equation (1) predicts the critical field for an elongated LC droplet, with semi-major axis a, semi-minor axis b, and aspect ratio l=a/b. $\sigma_{LC}$ and $\sigma_p$ are the electrical conductivities of the LC and polymer, respectively; $\bar{k}$ is an average elastic force constant while $\Delta\varepsilon$ is the dielectric anisotropy, both considered constant properties of the bulk LC. This equation can identify properties to target for reducing the switching voltage, though certain constraints will apply. An arbitrary change in one parameter can adversely affect other parameters so care must be taken in modifications to the syrup. The modifications described below either retain performance parameters at their optimum level or enhance them. Also, the droplet size a must be kept small to keep scattering losses down and the aspect ratio l can also be controlled but may be traded off against other parameters (e.g., polarization dependence or index modulation). Other parameters to target include the conductivity ratio, the force constant, and the dielectric anisotropy.

Cyanobiphenyls are known to contain ionic impurities that contribute to the conductivity of the LC. These are difficult to eliminate. However, the conductivity of the polymer matrix may be modified by increasing $\sigma_p$ which lowers the conductivity ratio and reduces the critical field for switching. Addition of the surfactant (e.g., octanoic acid) has already reduced this ratio some by increasing the matrix conductivity but surfactants also tend to dilute the LC and lower its order parameter, thereby reducing the nematic-isotropic temperature. Therefore, this invention introduces a monomer that can be chemically incorporated into the acrylate network and it increases the conductivity of the polymer matrix. One example of this type of monomer is acrylic acid. Acrylic acid is a weak organic acid ($pK_a$=4.25) that increases the conductivity of the polymer matrix by contributing a free proton to the matrix. This process is described by the following equilibrium reaction:

RCOH 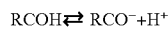 RCO$^-$+H$^+$ where R is an acrylate incorporated by a covalent bond into the polymer network.

The conductivity of the matrix may increase from incorporation of this type of monomer such that the critical field—and thus the switching voltage of the film—is significantly reduced. Illustrative examples are given in the table below.

TABLE 2

| Sample | wt-% Surfactant | wt-% - Acrylic Acid | Switching Voltage ($V_{rms}/\mu m$) | Switching Current, $I_{rms}$ (mA) |
|---|---|---|---|---|
| 1 | 4.5 | 0 | 14.1* | 6 |
| 2 | 4.5 | 1 | 12.6* | 6 |
| 3 | 4.5 | 1.5 | 6.9 | 5.9 |
| 4 | 6 | 1 | 9.07 | 6.8 |

*Based upon 8 μm nominal thickness

Incorporation of such monomers is therefore useful in reducing the switching field necessary for clearing H-PDLC devices. Results based upon analysis of the grating devices (i.e., the holographically recorded film contained between transparent electrode-coated substrates) indicate that an optimum concentration can be reached whereby the relative ratios of surfactant and conducting monomer have optimal switching voltage and power consumption as described below.

When power dissipation in electrically switchable holograms is high, it can lead to joule heating, which in some cases can cause problems with thermal stability. Large power consumption also requires a more expensive electrical power supply and larger voltages—which may lead to electrical shorting that destroys the usefulness of the hologram. In switchable PDLC gratings, power consumption and dissipation comes from current drawn to charge up the transparent electrodes, and resistive heating in the transparent electrodes and in the hologram (due to a finite conductivity of the PDLC material). Power consumption is related to the electrical power density P dissipated as heat in the hologram. At the critical field, this is given approximately by $P=\sigma_p E_c^2$. As the matrix conductivity increases, σp goes up linearly while $E_c^2$ goes down quadratically. Therefore, for minimum power consumption, there is an optimum value of σp given by setting the derivative $dP/d\sigma_p$=0. This yields the optimal relation σp=$\sigma_{LC}$/2. The effect of the conductivity ratio may be estimated by using Equation (1) to calculate the critical field in the idealized situation when the conductivity ratio is zero, and comparing that to the actual situation shown by sample 1 in Table 2. Assuming typical LC droplet parameters learned through electron microscopy of samples (a~0.06 μm, b~0.04 μm, l~1.5), and values of parameters for the LC BL045 (see above) used in the syrup [ $\bar{k}$=($k^{11}$+$k_{33}$)/2=16.75×10$^{-12}$ N, $\Delta\varepsilon$=15.3$\epsilon_0$, $\epsilon_0$=8.85×10$^{-12}$ F/m], the estimation is $E_c$~4 V/μm (vs. an experimental value of 14 V/μm, though experimental values have ranged from 14–18 V/μm). This implies that the conductivity ratio in the samples without the acrylic acid monomer is ~5–7. Addition of 1.5 wt-% high conductivity monomer reduced the switching voltage by a factor of 2, which implies that the conductivity ratio decreased correspondingly to ~1.5–2.5. This is close to the optimum ratio given above for minimum power consumption. Further reduction can be achieved by reducing $E_c$ but holding $\sigma_p$ constant.

In other embodiments, monomers other than weak acids as described in the example may be employed which increase conductivity upon incorporation into the polymer matrix. Examples of materials that may be of use include reactive ionic materials, aromatic materials which provide electron delocalization, or monomers which are used to make conducting polymers such as conjugated aromatics and polypyrroles. Also, the use of long and intermediate chain-length acrylated or methacrylated acids of the type ($H_2CCH$—(CO)O—R—(CO)OH, where R is a linear or branched alkyl chain may be effective. These materials may provide similar improvements in matrix conductivity to those already described. Again, an aspect of this invention is the control of matrix conductivity to lower switching voltage without contaminating or diluting the LC droplet.

In yet another embodiment of the present invention, the hologram material allows control of the switching voltage and voltage creep via control over the LC/polymer interfacial elasticity. When bulk values of the elastic force constant are substituted into Equation (1), an assumption that the interface has no effect on the elastic properties of the droplet is required. This is equivalent to the case of strong anchoring in ordinary LC cells—the surface interaction energy of the LC and polymer is infinite. This may be similar to the case in the pentaacrylate system discussed above, because (a) the interaction between the LC and the polymer may be mediated by hydrogen bonds, which are generally stronger than van der Waals forces, and (b) the pentaacrylate polymer is very stiff. This shows that the surface energy can be lowered by establishing an interface at the phase-separated LC that would form weaker bonds and be more elastic. A potential problem with this approach is that favorable properties of the free-radical initiated multi-functional acrylate system, which gives such good diffraction grating properties, may be surrendered. This invention uses the following approach to solve this problem.

A second monomer, which polymerizes by a different chemistry than that of the multi-functional acrylate is added to the syrup in relatively low concentration. In particular, its polymerization is dominated by a slow, step-growth process, and may be initiated by an external stimulus that is different than the radiation used to record the hologram. Alternatively, it may be weakly initiated with the recording radiation, but its rate of polymerization is slow compared to the rates of diffusion and phase separation. These monomers and/or oligomers are chemically compatible with the LC, because they remain in solution with the LC and diffuse and phase separate with the LC when the hologram is recorded. After the hologram is recorded, the second polymerization process is initiated, or caused to accelerate, by the application of an external stimulus. A second phase separation may occur where the second monomer, because of its lower surface energy, preferentially polymerizes about the surface of the LC droplet, forming a sheath that separates the LC from the multi-functional acrylate polymer. This polymer (a) does not readily form hydrogen bonds with the LC molecules (it interacts with LC molecules through the relatively weaker van der Waals forces instead), and/or (b) is a soft, more elastic interface that "gives" more in its interaction with the LC (i.e., it is less stiff than the multi-functional acrylate polymer).

The effect of this second polymer sheath is two-fold. First, since it lowers the interfacial energy, it also reduces the effective elastic force constant of the LC. As shown by Equation (1), it also reduces the critical field for switching (i.e., it lowers the switching voltage). Second, it buffers the effects of the multi-functional acrylate polymer on the elastic properties of the LC. In other words, as post-polymerization proceeds in the acrylate polymer—stiffening the network with time—the interface between the LC and the second polymer is not affected, it remains soft and more elastic. Since the interfacial elastic properties remain constant with time, there is significantly less voltage creep.

A trade-off is required to obtain this benefit. A stiffer medium, though more difficult to deform by an applied field, snaps back to its original form more rapidly because of the strong elastic restoring force—its relaxation time is very short. The same elongated droplet model leading to Equation (1) predicts a relaxation time (when the applied field is turned off) given by $$\tau_{off} = \frac{\gamma_1 a^2}{\overline{k}(l^2 - 1)} \quad (2)$$

where $\gamma_1$ is the rotational viscosity coefficient of the LC. Thus, a reduction in the effective elastic force constant that produces a reduction in the critical field by a factor of M will tend to increase the relaxation time by a factor of $M^2$. If the longer relaxation time is still compatible with the switching time needed for a particular application, then the slower relaxation is not a severe penalty.

The second type of monomer described in this invention may polymerize in a secondary process following recording of the hologram. In a preferred embodiment of the present invention, this monomer polymerizes via a thiol-ene step-growth mechanism upon ultra-violet (UV) illumination of the film (i.e., these materials contain a UV photoinitiator). In alternative embodiments of the present invention, other polymerization mechanisms and/or other initiation methods such as visible light, heat, electron beams, or the presence of reactants could be used to achieve the intended effects. In a preferred embodiment, concentration ranges are 30–50% primary monomer, 30–50% liquid crystal, 0.1–2% initiator and co-initiator, 5–15% reactive diluent, 0–10% surfactant-like material, and 5–20% added/secondary monomer. In other embodiments, the secondary monomer can be a commercially available monomer such as a Norland optical adhesive ("NOA") from Norland Products, for example, NOA 61, NOA 76, NOA 65, NOA 83H, NOA 88 and the like.

Figure 1A:
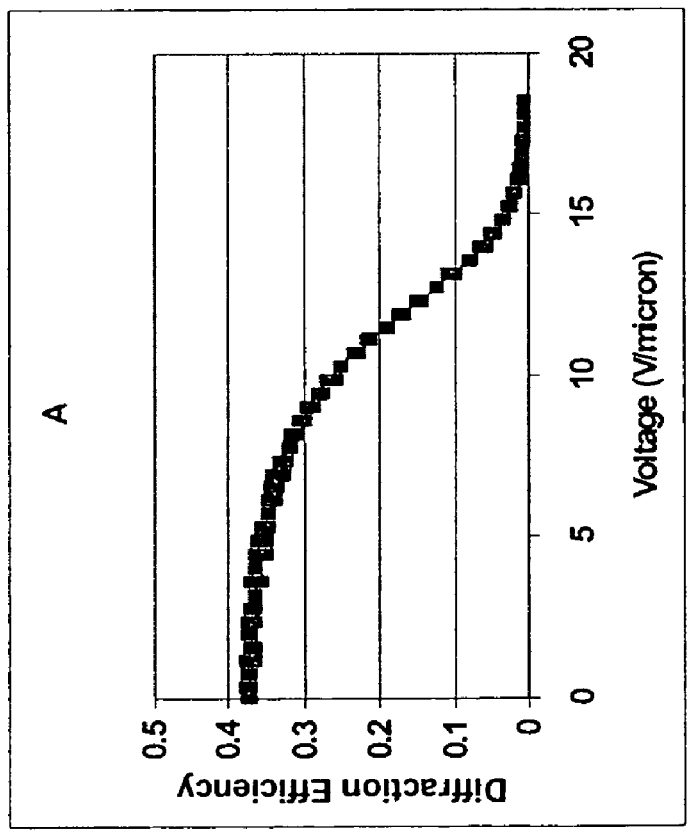

Another effect has been on the switching characteristics. In the examples given in FIG. 1, for an otherwise identical pre-polymer formulation, the switching voltage of a sample that does not contain the secondary monomer, i.e., thiol-ene, was approximately 15 V/µm, while the switching voltage of a sample formulated with the secondary monomer, i.e., thiol-ene, was 6 V/µm after UV post-cure—a reduction in switching voltage of 60% was observed. This indicates a 40% decrease in switching voltage (almost a factor of 2) over the best results observed in the prior art.

Figure 2:
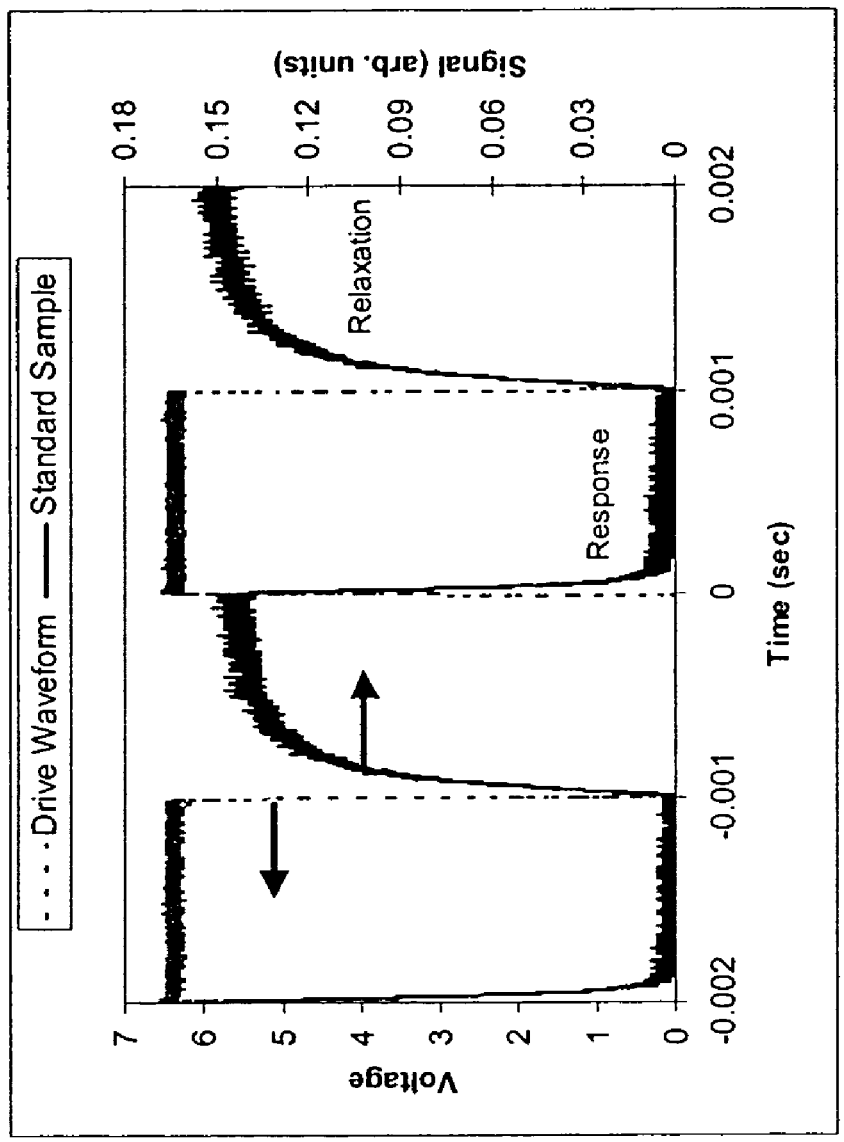
FIG. 2 shows response and relaxation time measurements for a sample according to an embodiment of the present invention.

As discussed above, the primary cause of the observed voltage reduction can involve reduction of the LC anchoring with the polymer "sheath" produced by the added secondary monomer. The decreased anchoring can reduce the effective elastic force constant ($\overline{k}$) contained in Equations (1) and (2). This reduced anchoring, as described, can also to lead to an increase in the relaxation time ($\theta_{off}$). FIG. 2 is an example of the response and relaxation time measurements for a sample that does not contain the secondary monomer, i.e., thiol-ene. In this specific embodiment, the response times for the sample not containing the thiol-ene material and for the sample containing it are similar at 48 µs and 52 µs, respectively. For this same specific embodiment, the relaxation times are markedly different however, with values of 223 μs and 707 μs for the non-thiol-ene and thiol-ene containing films, respectively.

Figure 3:
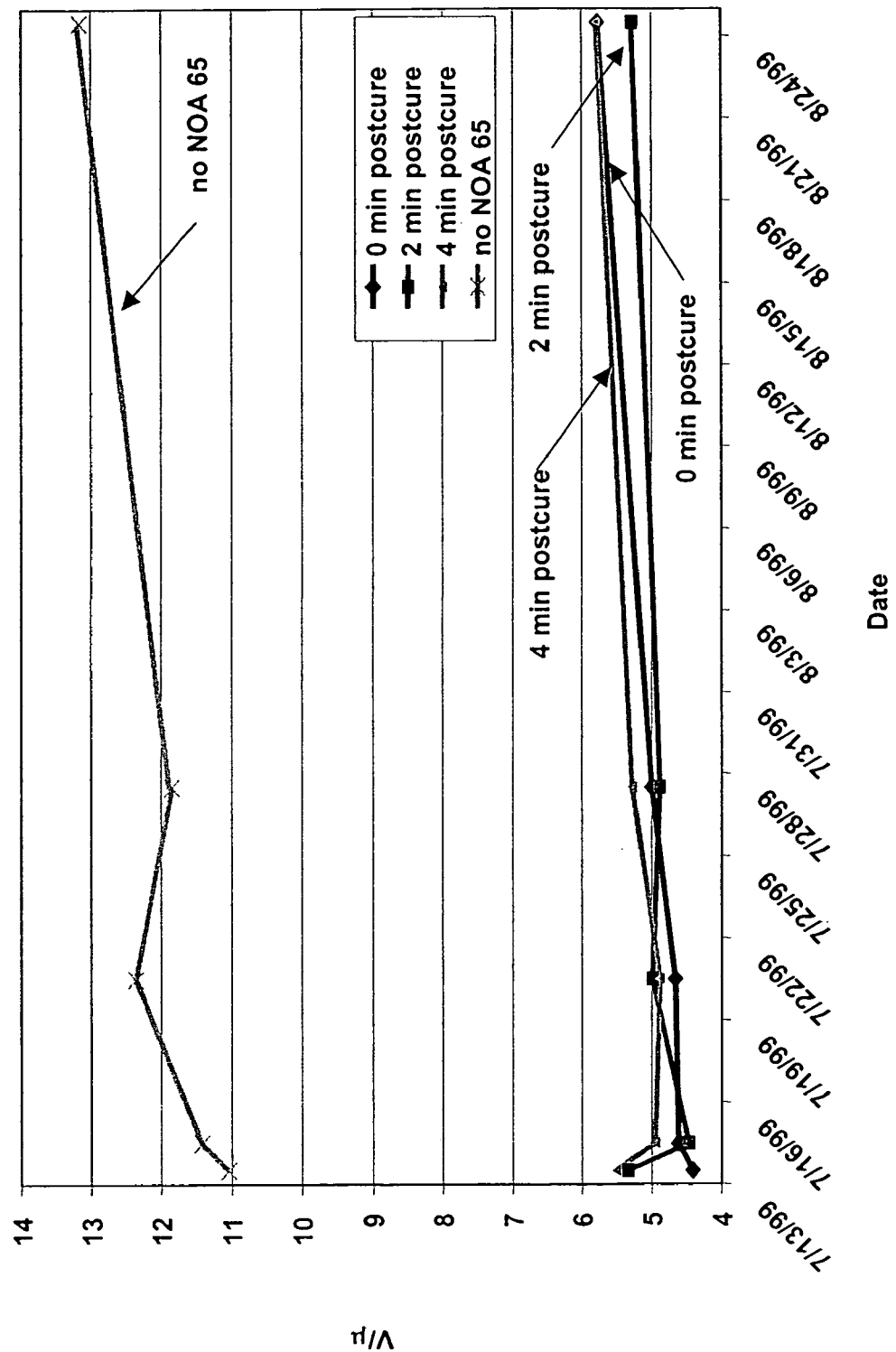
FIG. 3 shows the switching voltage as a function of time following holographic recording within a sample according to an embodiment of the present invention.

The required switching field at the time of recording is an important factor in determining the overall usefulness of a sample, though the switching field after a normal use period may be more determinative. Further to the specific embodiment, switching voltage recorded at the time of recording increases by as much as 100% after 7 days of storage in the dark. Using the method described above to reduce switching voltage, this voltage creep has decreased significantly. Representative examples are shown in FIG. 3—the post-recording voltage in the formulation described increased by approximately 27%. In syrups containing the thiol-ene monomers the voltage increase was greater than 47% when the sample was not post-cured with UV. But identical samples with thiol-ene monomers showed no significant increase when they were UV post-cured for several minutes, which shows that the increase in switching voltage is arrested by the addition of these monomers to the syrup and subsequent post-cure.

Further, the incorporation of secondary monomers which cure in a secondary process allow for the use of previously unacceptable LC materials with varying optical or chemical properties for optimizing H-PDLCs for specific applications. For example, LC material TL213 when incorporated without a secondary monomer, requires an extremely high switching voltage. Where as the same LC material, when incorporated into a test mixture that also includes a secondary monomer, such as one of the NOA monomers, led to improved phase separation, and higher diffraction efficiencies. Certain LC materials, such as TL213, have a Δn very similar to other LC materials, such as BL045 or other BL series LC materials, but the Δε of TL213 is significantly lower. Gratings made with this LC material, or other materials having similar Δn and Δε characteristics, switch at prohibitively high voltages when used in the single monomer embodiments described above. This prohibitively high switching voltage rendered components using these materials, without the addition of a secondary monomer, unusable for many applications. On the contrary, and in accordance with this embodiment of the present invention, upon incorporating a secondary monomer, such as those described above, into the PDLC syrup, the switching voltage is lowered and the H-PDLC components maintain the improved characteristics stemming from the TL213 LC material. One skilled in the art recognizes the currently available equivalent LC materials which may be used on both the single monomer and the double monomer embodiments described herein.

Again, the secondary monomers are used to preferentially segregate with the LC during holographic recording. Within the LC droplets the secondary monomers act as diluents, reducing the order parameter and disrupting the phase behavior. Upon UV illumination, the growing secondary monomer polymers phase separate from the LCs and coat the surfaces of the droplets in a thin layer. The interaction between the secondary polymer and the LC is less than that observed for the primary polymer with the LCs. This causes the reduced switching voltage of the H-PDLC. Furthermore, the secondary polymer coating on the droplets can shield the LC from the effects of the primary polymer post-polymerization, thereby reducing the voltage creep. Also, the phase separation of the secondary polymer from the LC eliminates or reduces its diluent effect, which causes the increase in diffraction efficiency sometimes observed upon UV illumination. One skilled in the art recognizes that multiple combinations of primary and secondary monomers and initiation methods are contemplated by the scope of this invention.

Thus, features of the embodiments discussed above include the incorporation of a step-growth monomer into the free-radical monomer system that polymerizes using a different chemistry than the free-radical host system, a step-growth monomer that preferentially diffuses with (and remains miscible with) the LC during holographic recording—and curing of the multi-functional free-radical polymer—that can be later polymerized by a second initiation mechanism which is followed by a second phase separation where the step-growth polymer forms an elastic sheath about the LC droplet such that it reduces the effective elastic constant of the LC—thereby lowering the switching voltage—and buffers the LC from the effects of post-polymerization in the multi-functional polymer host, thereby reducing voltage creep.

In yet another embodiment of the present invention, the hologram material allows control of the contrast ratio and/or dynamic range of the material via control over the matrix index and LC index. Many applications require very high contrast between the intensity of the light diffracted from a grating in the field-off versus the field-on state. To increase the contrast ratio it is necessary to match $n_{LC}$ closely to $n_p$ at a particular applied voltage. In an embodiment of the present invention, alkyl chain molecules are added to the syrup to match the indices of the LC droplets and the polymer surrounding the PDLCs in the voltage on-state. Alkyl chain molecules are chemically compatible with LC molecules, which also have long alkyl chains. The alkyl chain additives preferentially phase separate with the LC and thereby modify the effective refractive index of the droplets such that in the voltage on-state the droplet index is substantially matched to the surrounding polymer index, producing a minimum diffraction efficiency.

The refractive index of the LC droplet will vary between maximum ($n_{max}$) and minimum ($n_{min}$) values as an electric field is applied. To obtain zero diffraction efficiency, $n_{min}$ should be exactly matched to the surrounding polymer index $n_p$. In samples comprised of the syrup discussed above, $n_{min} > n_p$. Compounds having smaller index $n_a$ mixed with the LC will lower the effective LC index and achieve $(n_{mix})_{min} \approx n_p$. Using the following standard Clausius-Mosatti relation for the refractive index of a mixture of dielectric materials, $$n = n_2 + f(n_2 - n_1) \quad (3)$$

$(n_{mix})_{min} \approx n_p$ can be approximated as follows:

$$(n_{mix})_{min} \approx n_p \approx n_m + ((f_a/(f_a + f_{LC}))(n_a - n_{min}) \quad (4)$$

wherein $f_a/f_a + f_{LC} = f_{a:LC}$. And the required relative-volume-fraction $f_{a:LC}$ of additive (a) to liquid crystal (LC) can be estimated as follows for the refractive index of a mixture of dielectric materials, when the difference in indices of the two materials is $\leq 0.5$:

$$f_{a:LC} = \frac{n_{min} - n_p}{n_{min} - n_a}. \quad (5)$$

Note that $n_{min}$ and $n_p$ must be obtained from measurements, (i.e., $n_{min}$ usually from diffraction efficiency measurements and $n_p$ usually from refractometer measurements).

Other embodiments of the present invention use long chain alkyl compounds as potential surfactants for the mixture. In some cases, a surfactant itself can serve as the additive for index matching. In others, another alkyl molecule not comprised of a polar head can serve as the additive. It should be noted that a surfactant has specific properties for controlling the interfacial anchoring of the LC-polymer interface, but when used as an additive, its intended function is to modify the refractive index of the LC droplet. The surfactant molecule can serve dual purposes in some cases, but it is not absolutely necessary that the additive be a surfactant.

Although the photoinitiator and co-initiator start the polymerization, they are minor components in the mixture. The major components, other than the polymerizable monomer, are the LC, the cross linker, the long chain alkyl additive and the surfactant (if added). All of the components are originally mixed homogeneously. When the mixture is subjected to the light of an interferogram, photopolymerization is preferentially started in the bright fringes of the interferogram. Monomers are thus consumed to form new species as polymer and oligomer chains start to grow. The cross linker participates in this chemical reaction and is thus also preferentially consumed in the bright fringe regions. Hence, the concentrations of monomer and cross linker in the bright regions decrease relative to their respective concentrations in the dark regions of the interferogram. By Fick's law, this gradient in concentration of species causes a diffusion of monomer and cross linker from the dark regions to the bright regions where they in turn also participate in the chemical reaction. At the same time, constituents which are not consumed in the chemical reaction (e.g., LC and additive molecules) increase their relative concentrations in the bright regions relative to the dark regions because a number of monomer and cross linker molecules have been consumed in the chemical reaction while the number of LC and additive molecules within the same spatial domain have remained unchanged, at least temporarily. Fick's law applies again, driving the diffusion of LC and additive molecules away from the bright regions and into the dark regions of the interferogram. The monomer and cross linker diffuse to the bright regions, and the LC and additive diffuse to the dark regions.

As the cross link density increases, the molecular weight of the polymer grows, and the polymer network spreads out into the dark regions of the interferogram. Eventually, the mixture of LC with growing polymer becomes unstable, and the LC separates out as a distinct phase. This can occur as nucleation of small LC droplets with subsequent growth by diffusion of LC molecules. Growth is terminated when the polymer network becomes sufficiently rigid. However, because of the anisotropic diffusion of LC into the dark fringe regions, the LC phase-separates there into distinct channels, forming a volume hologram.

The ratio of additive to phase-separated LC can remain the same after photo-curing as it starts out in the uncured mixture. In this situation, the overall volume fraction of additive $f_a$ needed in the mixture can be estimated in terms of the starting LC volume fraction $f_{LC}$ and the relative volume fraction $f_{a:LC}$:

$$f_a \approx \frac{f_{LC} f_{a:LC}}{1 - f_{a:LC}}. \quad (6)$$

This generally gives a lower bound on the amount of additive required since one cannot guarantee that the additive and LC will stay in the same relative ratio as they phase separate. An alternative is obtained by measuring the actual index difference $\Delta n = (n_{mix})_{min} - n_p$ for more than one value of the starting ratio $f_a/f_{LC}$. A plot of these data is formed, and a curve is fit to the data. The desired starting value of $f_a/f_{LC}$ is found as the curve of $\Delta n$ vs. $f_a/f_{LC}$ is extrapolated to cross the $\Delta n=0$ axis.

By way of example, a group of low index, long alkyl chain molecules with their respective refractive indices $n_D$ at the sodium D-line is given in Table 3 below. The compounds in the bottom part of the table, as indicated by the dotted line, are also surfactants. The compounds in the top of Table 3 are simple long chain alkyls with increasing chain length down the table. In all cases, the refractive index increases with increasing chain length. In general, the lower the refractive index, the less additive required to match LC and polymer indices.

TABLE 3

| Additive | $n_D$ |
|---|---|
| Nonane | 1.405 |
| Decane | 1.411 |
| Dodecane | 1.422 |
| Undecane | 1.417 |
| Tridecane | 1.425 |
| Tetradecane | 1.429 |
| Pentadecane | 1.434 |
| Hexadecane | 1.434 |
| Heptadecane | 1.436 |
| Hexanoic acid | 1.4161 |
| Heptanoic acid | 1.4224 |
| Propyl pentanoic acid | 1.4250 |
| Octanoic acid | 1.4278 |

In one embodiment of the present invention, this technique uses octanoic acid as the additive for index matching (not as surfactant in this embodiment). The measured refractive index difference at switching for $f_a=0.0$ and 0.04 ($f_{LC}\sim0.3$), when combined with equations (5) and (6), leads to the prediction that $f_a\sim0.0635$ yielding a $\sim0\%$ diffraction efficiency. Actual volume fractions and minimum diffraction efficiency ($\eta_{min}$) measurements are shown in Table 4 below. Measurements were performed at a wavelength of 633 nm. With minor changes of the additive and more careful control over parameters, it is possible to achieve $\eta_{min}<0.01\%$ (i.e., <0.0001).

TABLE 4

| Volume Fraction of Octanoic Acid | $\eta_{min}$ |
|---|---|
| 0.0 | 0.05 |
| 0.04 | 0.006 |
| 0.0634 | 0.00017 |

Adding diluents to the LC can have a negative impact on the thermal properties of the grating due to a lowering of the LC order parameter. According to this embodiment of the present invention, small amounts of co-monomers are added to the syrup to vary the refractive index of the polymer matrix. The refractive index of a copolymer can be estimated by knowing the index of each of the homopolymers and the weight fraction of the monomers and a more explicit solution can be obtained using the Lorentz-Lorenz equation:

$$(n^2-1)/(n^2+2)=\rho r \quad (7)$$

where n is the refractive index, $\rho$ is the density, and r is the specific refractivity, each of the individual homopolymer. Given the refractive indices $n_A$ and $n_B$ of the homopolymers A and B, and their corresponding densities $\rho_A$ and $\rho_B$, their specific refractivities may be calculated from Eq. (7). The specific refractivity of the co-polymer (two polymers A and B) is found from $r_{AB}=f_A r_A+(1-f_A)r_B$, where $f_A$ is the weight fraction of polymer A. Using this value of specific refractivity in Eq. (7), along with the density of the co-polymer $\rho_{AB}=f_A\rho_A+(1-f_A)\rho_B$, the co-polymer refractive index $n_{AB}$ may be predicted. An analysis such as this allows one to select a polymer of index $n_A$ and weight fraction $f_A$ to modify the refractive index of the main polymer from $n_B$ to $n_{AB}$.

Monomers for use in this embodiment include fluorinated mono-acrylates and methacrylates (e.g., hexafluoroisopropyl acrylate (n~1.42)). Fluorinated mono-acrylates have very low refractive indices with respect to the high functionality aliphatic monomers that are currently used. Other monomers include the n-alkyl mono-acrylates such as octyl acrylate and decyl acrylate. As with the fluoro-acrylates, these long chain mono-acrylates have refractive indices lower than that of the primary polymer and therefore reduce the overall refractive index of the H-PDLC matrix. In contrast, materials such as aromatic acrylates and those monomers containing the heavier halogens (e.g., bromine and/or iodine) have higher refractive indices than that of the primary monomer and can therefore be used to increase the overall refractive index of the H-PDLC matrix. Some examples of this type of monomer include tribromo-phenylacrylate and pentabromo-phenylacrylate with refractive indices of approximately 1.6 and 1.7 respectively.

In the embodiments mentioned above, chemically compatible materials (e.g., long chain alkyls to the LC, or acrylates to the polymer) to control the index match between $n_{min}$ of the LC droplet and $n_p$ of the surrounding polymer—such that the additive materials have minimal impact on the other properties of the switchable hologram—may be added.

Some applications may place the switchable PDLC hologram in harsh environments that may degrade its properties. Typical environmental parameters that prove deleterious to operation include temperature, humidity, and UV exposure, although the most severe of these is probably temperature. LCs nominally have freezing points below 0° C. and nematic-to-isotropic (N-I) transition points at 65–100° C. The high temperature range is usually the most problematic in devices. Any contaminants or diluents in the LC will lower its order parameter and thereby reduce its N–1 transition. This in turn can significantly reduce diffraction efficiency. For example, the N-I transition may be reduced by as much as 30–40° C. by such contaminants/diluents. This severely restricts the operating temperature of the hologram.

In yet another embodiment of the present invention, the hologram material allows control over thermal stability via control of the diluent and after processing of the H-PDLC. Commercially available liquid crystal mixtures are typically eutectic solutions that are formulated to provide a broad nematic temperature range. However, as would be expected, some LCs perform better as the typical operating temperature is raised. This embodiment includes two LCs. The first LC (a mixture of cyanobiphenyls) has acceptable diffraction efficiency but lower switching voltage at room temperature. However, after incorporating the reflection-grating stack into the system, this formulation underwent a LC phase transition below the operating temperature of the holograms in the device. The second LC (a mixture of fluorinated biphenyls) has a higher diffraction efficiency and higher switching voltage, but it also possesses a higher N-I transition. Upon incorporating H-PDLCs made with the alternative liquid crystal into the filter stack and operating at the elevated temperature, it has a wider operating temperature and better diffraction efficiency at elevated temperature, but the elevated temperature also reduced the viscosity of the LC leading to lower switching voltages which were more favorable for the application. The incorporation of additives into the syrup can depress the transition temperature of the LC, narrowing the nematic range. Also, LCs with a wider nematic range can give better electro-optical properties throughout an array of operating temperatures, even if the properties at ambient temperatures (e.g., switching voltage) are not as favorable. Finally, for applications involving operation at a given temperature, the choice of liquid crystal and other formulation components can be optimized for that specific temperature.

This embodiment includes the addition of surfactants—which act as diluents and lower the order parameter of the LC—which lower the N-I transition of the H-PDLC. In some embodiments, the surfactants are long alkyl chain acids. In two preferred embodiments, decanoic ($C_{10}$ chain) and dodecanoic ($C_{12}$ chain) acids are used. Using the syrup previously discussed but substituting decanoic acid or dodecanoic acid for the octanoic acid increased this temperature range to ~50° C. With dodecanoic acid the concentration can be lowered to 4-wt % and the switching voltage can be reduced by a factor of ~2 at elevated temperatures while the diffraction efficiency decreases by only ~3%.

The embodiments discussed herein also increase the temperature range discussed above. In a preferred embodiment, a combination of white light exposure (several hours in room lights) and heat cycling (25-75-25° C.) extends the temperature range of the diffraction efficiency with switching voltage reducing at operating temperature. An example of this embodiment is shown in Table 5 for syrups containing 4-wt % and 3-wt % dodecanoic acid (DDA). The samples were exposed to room lights for 240 hours and temperature-cycled as described above twice. In this embodiment, the maximum operating temperature (i.e., the point where the diffraction efficiency decreases by only 3% from room temperature) is extended to 55–60° C. while the switching voltage has decreased by a factor greater than 2. Before treatment, the samples had a maximum operating temperature of 39° C.

According to an embodiment of this invention, the operating temperature of an H-PDLC grating is increased while keeping the switching voltage at a low and reasonable value. This was accomplished by: 1) substituting a long chain acid (e.g., dodecanoic acid) for the common surfactant (octanoic acid), 2) heat cycling and white light exposure to extend the operating temperature of the H-PDLC grating (i.e., extending the temperature range over which the grating has diffraction efficiency loss of ≦3% compared to its room temperature value), and 3) taking advantage of the decrease in LC viscosity and/or elastic force constants with temperature to reduce the switching voltage at operating temperature to a low, reasonable value.

TABLE 5

| 3% DDA Sample | | | 4% DDA Sample | | |
| --- | --- | --- | --- | --- | --- |
| Temperature | DE | Sw. Voltage | Temperature | DE | Sw. Voltage |
| 25 | 40.8 | 140 | 25 | 43.4 | 174 |
| 27 | 40.7 | 138 | 27 | 43.2 | 174 |
| 29 | 40.6 | 132 | 29 | 43.4 | 165 |
| 31 | 41.0 | 129 | 31 | 43.6 | 159 |
| 33 | 40.7 | 126 | 33 | 43.7 | 160 |
| 35 | 40.5 | 126 | 35 | 43.9 | 157 |

TABLE 5-continued

| 3% DDA Sample | | | 4% DDA Sample | | |
|---|---|---|---|---|---|
| Temperature | DE | Sw. Voltage | Temperature | DE | Sw. Voltage |
| 37 | 40.7 | 126 | 37 | 43.9 | 156 |
| 39 | 40.7 | 115 | 39 | 43.9 | 146 |
| 41 | 40.6 | 115 | 41 | 43.8 | 138 |
| 43 | 40.7 | 108 | 43 | 43.8 | 129 |
| 45 | 40.7 | 105 | 45 | 43.5 | 120 |
| 47 | 40.6 | 96 | 47 | 43.3 | 117 |
| 49 | 40.4 | 93 | 49 | 42.7 | 111 |
| 51 | 40.0 | 90 | 51 | 41.7 | 85 |
| 53 | 39.9 | 81 | 53 | 41.2 | 84 |
| 55 | 39.7 | 78 | 55 | 40.2 | 81 |
| 57 | 39.1 | 70 | 57 | 37.0 | 70 |
| 59 | 37.9 | 63 | 59 | 33.4 | 60 |

Modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

The invention claimed is:

1. A process for reducing scattering effects in a polymer-dispersed liquid crystal optical element comprising:
   adding an interfacial tension agent to a polymer-dispersed liquid crystal material, the polymer-dispersed liquid crystal material comprising:
   at least one acrylic acid monomer;
   at least one type of liquid crystal material;
   a photoinitiator dye; and
   a co-initiator; and
   subjecting the polymer-dispersed liquid crystal material to a polymerizing means, wherein the interfacial tension agent reduces the size of liquid crystal droplets formed within the polymer-dispersed liquid crystal optical element during polymerization of the polymer-dispersed liquid crystal material.

2. The process according to claim 1, wherein the interfacial tension agent contains a hydroxyl group.

3. The process according to claim 1, wherein the interfacial tension agent is of the type: $C_nH_{(2n+1)}COOH$ wherein $n \leq 18$.

4. The process according to claim 1, wherein the polymer-dispersed liquid crystal material further comprises a reactive diluent.

5. The process according to claim 1, further comprising:
   a polymer matrix formed upon polymerization of the polymer-dispersed liquid crystal material containing the at least one acrylic acid monomer in an amount sufficient to increase the conductivity of the polymer matrix and cause a reduction in the switching voltage.

6. The process according to claim 1, wherein the at least one acrylic acid monomer is approximately 1.0–1.5 percent of the weight of the polymer-dispersed liquid crystal material.

7. The process according to claim 1, wherein the polymer-dispersed liquid crystal optical element further comprises a polymerizable monomer that is polymerized according to a different chemical process than the at least one acrylic acid monomer.

8. The process according to claim 7, wherein the at least one acrylic acid monomer is polymerized using a first polymerizing means and the polymerizable monomer is polymerized using a second polymerizable means.

9. The process according to claim 8, wherein the first and second polymerizing means are selected from the group consisting of: visible radiation, ultraviolet radiation, heat, electron beam, and reactants.

10. The process according to claim 7, wherein the at least one acrylic acid monomer is polymerized at a first time and the second polymerizable monomer is polymerized at a second time.

11. The process according to claim 7, wherein the polymerizable monomer is a thiol-ene.

12. The process according to claim 7, wherein the at least one acrylic acid monomer comprises approximately 30–50% of the polymer-dispersed liquid crystal material and the polymerizable monomer comprises approximately 5–20% of the polymer-dispersed liquid crystal material.

13. The process according to claim 8, wherein the at least one acrylic acid monomer is polymerized by a free-radical chemical reaction and the polymerizable monomer is polymerized by a step-growth chemical reaction.

14. The process according to claim 4, wherein the diluent is selected from the group consisting of decanoic acid and dodecanoic acid.

15. The process according to claim 4, wherein the diluent comprises approximately 3–4% of the polymer-dispersed liquid crystal material.

16. The process according to claim 1, wherein the interfacial tension agent is a long chain alkyl compound.

17. The process according to claim 1, further comprising the step of adding a co-monomer.

18. The process according to claim 17, wherein the co-monomer is selected from the group consisting of fluorinated mono-acrylates and methacrylates.

* * * * *

UNITED STATES PATENT AND TRADEMARK OFFICE
CERTIFICATE OF CORRECTION

PATENT NO.        : 7,175,780 B1
APPLICATION NO.   : 11/332247
DATED             : February 13, 2007
INVENTOR(S)       : Richard L. Sutherland et al.

It is certified that error appears in the above-identified patent and that said Letters Patent is hereby corrected as shown below:

IN REFERENCES CITED (56) - Other Publications -

Title Page 2 Under Other Publications:

In Line 4 of the First Reference, please change "3004-3012, Dec. 2002." to -- pp. 3004-3012, Dec. 2002. --

In Line 1 of the Third Reference, please change "Bowley, Chris C., "Variable-Wavelength Switchable Bragg Grat-" to -- Bowley, Chris C., et al., "Variable-Wavelength Switchable Bragg Grat- --

In Line 1 of the Seventh Reference, please change "Sutherland, Richard L., "Switchable Holograms for Displays and" to -- Sutherland, Richard L., et al., "Switchable Holograms for Displays and --

In Line 1 of the Eleventh Reference, please change "Cole, Michael C., "Photoinitatorless Photopolymerizations Involv-" to -- Cole, Michael C., et al., "Photoinitiatorless Photopolymerizations Involv- --

In Line 2 of the Eleventh Reference, please change "ing Monomers That Form Charge Trnasfer Complexes," Radtech" to -- ing Monomers That Form Charge Transfer Complexes," Radtech --

IN THE CLAIMS -

In Column 19, Line 47, please change "$n \leq 18$." to -- $n \leq 18$. --

Signed and Sealed this

First Day of May, 2007

JON W. DUDAS
*Director of the United States Patent and Trademark Office*